US009958135B2

(12) United States Patent
Spiegel et al.

(10) Patent No.: US 9,958,135 B2
(45) Date of Patent: May 1, 2018

(54) COVER ELEMENT FOR FLAT LUMINAIRE

(71) Applicant: ZUMTOBEL LIGHTING GMBH, Dornbirn (AT)

(72) Inventors: Michael Spiegel, Dornbirn (AT); Tanja Ilic, Dornbirn (AT)

(73) Assignee: ZUMTOBEL LIGHTING GMBH, Dornbirn (AT)

( * ) Notice: Subject to any disclaimer, the term of this patent is extended or adjusted under 35 U.S.C. 154(b) by 124 days.

(21) Appl. No.: 14/783,860

(22) PCT Filed: Apr. 17, 2014

(86) PCT No.: PCT/EP2014/057927

§ 371 (c)(1),
(2) Date: Oct. 10, 2015

(87) PCT Pub. No.: WO2014/173819

PCT Pub. Date: Oct. 30, 2014

(65) Prior Publication Data

US 2016/0069532 A1 Mar. 10, 2016

(30) Foreign Application Priority Data

Apr. 25, 2013 (DE) .................... 20 2013 101 791 U

(51) Int. Cl.
*F21V 7/00* (2006.01)
*F21S 8/04* (2006.01)
(Continued)

(52) U.S. Cl.
CPC .............. *F21V 7/0083* (2013.01); *F21S 8/04* (2013.01); *F21V 17/164* (2013.01); *F21Y 2105/10* (2016.08); *F21Y 2115/10* (2016.08)

(58) Field of Classification Search
CPC ........ F21V 7/0083; F21V 17/164; F21S 8/04; F21Y 2105/10; F21Y 2115/10
(Continued)

(56) References Cited

U.S. PATENT DOCUMENTS 3,838,268 A 9/1974 Fabbri
4,336,576 A 6/1982 Crabtree
(Continued)

FOREIGN PATENT DOCUMENTS

CN 1710323 12/2005
CN 101986004 3/2011
(Continued)

OTHER PUBLICATIONS

International Search Report for PCT/EP2014/057927, English translation attached to original, Both completed by the European Patent Office on Jun. 12, 2014, All together 6 Pages.
(Continued)

*Primary Examiner* — Laura Tso
(74) *Attorney, Agent, or Firm* — Brooks Kushman P.C.

(57) ABSTRACT

A frame-like cover element for a luminaire including a box-shaped luminaire housing, which has a light exit opening on one side, is designed to be arranged on the housing in the region of the light exit opening thereof and in the process to enclose, in frame-like fashion, a light output region of the luminaire, wherein the cover element is connected integrally to at least one optical element, which extend into the inner region of the luminaire housing and is intended to influence the light output by the luminaire.

6 Claims, 3 Drawing Sheets

(51) Int. Cl.

*F21V 17/16* (2006.01)
*F21Y 105/10* (2016.01)
*F21Y 115/10* (2016.01)

(58) Field of Classification Search

USPC ....... 362/342, 97.3, 237, 238, 241, 247, 290
See application file for complete search history.

(56) References Cited

U.S. PATENT DOCUMENTS

| | | | |
|---|---|---|---|
| 5,479,327 | A | 12/1995 | Chen |
| 6,793,368 | B2 | 9/2004 | Ladstatter |
| 7,229,192 | B2 | 6/2007 | Mayfield, III et al. |
| 7,465,070 | B2 | 12/2008 | Engel |
| 2008/0084693 | A1 | 4/2008 | Shimada et al. |
| 2008/0219000 | A1 | 9/2008 | Fan |
| 2010/0073928 | A1 | 3/2010 | Kim et al. |
| 2010/0182789 | A1 | 7/2010 | Tsai |
| 2011/0292655 | A1* | 12/2011 | Ing .......................... G09F 13/14 362/241 |
| 2012/0188766 | A1 | 7/2012 | Lu et al. |
| 2013/0039054 | A1 | 2/2013 | Yang et al. |
| 2013/0265744 | A1* | 10/2013 | Park .................. G02F 1/133603 362/97.3 |

FOREIGN PATENT DOCUMENTS

| | | |
|---|---|---|
| DE | 3238876 | 4/1984 |
| DE | 10151958 | 4/2003 |
| DE | 102004019137 | 11/2005 |
| DE | 102009056904 | 6/2011 |
| EP | 0359069 | 3/1990 |
| EP | 1188983 | 4/2011 |
| WO | 2005066540 | 7/2005 |
| WO | 2007130536 | 11/2007 |

OTHER PUBLICATIONS

Second Chinese Office Action for CN 201480022922.0, Enlgish Translation attached to original, both completed by the Chinese Patent Office, Dated Dec. 8, 2017, All together 13 Pages.

* cited by examiner

COVER ELEMENT FOR FLAT LUMINAIRE

CROSS-REFERENCE TO RELATED APPLICATION

This application is the U.S. national phase of PCT Application No. PCT/EP2014/057927 filed on Apr. 17, 2014, which claims priority to DE Patent Application No. 20 2013 101 791.4 filed on Apr. 25, 2013, the disclosures of which are incorporated in their entirety by reference herein.

The present invention relates to a frame-like cover element according to the preamble of claim 1 which is provided for covering the edge region of a so-called flat luminaire.

A flat luminaire generally has a box-shaped, usually rectangular, housing, which at one side forms a light exit opening via which light is emitted in a planar fashion. In this regard, the flat luminaire differs from other luminaire designs in which light or emitter is emitted individually via individual light sources.

Within the box-shaped luminaire housing, provision is then made of light sources and optical units which are assigned to the light sources and via which the emitted light is correspondingly influenced. While it was conventional practice in the past to arrange some elongate fluorescent lamps parallel to one another, LED-based light sources are now increasingly being used. In the case of flat luminaires, here in particular relatively large LED printed circuit boards are used, on which the LEDs are arranged in a matrix-like fashion. The latter are then generally arranged on the base surface of the housing and, if appropriate, protected against being touched by means of additional measures, such that, firstly, so-called ESD damage to the LEDs is avoided and, secondly, there is also no risk of an electric shock being sustained in the event of touching.

For optical reasons, such luminaires generally have a frame-like cover element. The latter is arranged on the luminaire housing at the side of the light exit opening and serves to enclose the actual light exit opening, via which light is emitted, in a frame-like fashion. This is primarily an element which improves the appearance of the luminaire.

Depending on the type of the light sourcees arranged in the luminaire housing and the desired light emission, optical elements via which the emitted light is influenced are arranged within the housing, as already mentioned. Hitherto these have generally been separate components fixed in the housing in a corresponding manner.

Proceeding from the prior art described above, the present invention is based on the stated object of specifying a novel solution for realizing such a flat luminaire which is simplified with regard to its construction.

The object is achieved by means of a frame-like cover element comprising the features of claim 1. The dependent claims relate to advantageous developments of the invention.

The concept according to the invention provides for combining the two components, cover element and optical element, in such a way that an integral structural unit is formed. As a result, not only are material costs saved, since it is no longer necessary to produce separate components, but the manufacturing process or the assembly of the luminaire is also optimized since ultimately fewer individual components have to be joined together.

The invention therefore proposes a frame-like cover element for a luminaire comprising a box-shaped luminaire housing, which has a light exit opening at one side, wherein the cover element is designed to be arranged on the housing in the region of the light exit opening thereof and in the process to encompass a light emission region of the luminaire in a frame-like fashion, and wherein according to the invention the cover element is integrally connected to an optical element, which preferably extends into the inner region of the luminaire housing and which is provided for influencing the light emitted by the luminaire.

The optical element, which is part of the cover element or is integrally connected thereto, can be, for example, a grid arrangement, in particular a so-called cell grid. Such optical units are used for example if light is intended to be emitted over a relatively large area, but at the same time the intention is to give the impression as though a multiplicity of individual light sources were present. In this case, the grid arrangement can have, for example, a plurality of matrix-arranged reflector cells which are embodied in each case in a truncated-pyramid-like fashion.

As an alternative thereto, however, the optical element can also be one or a plurality of reflector walls which extend from the cover element toward a light source situated in the luminaire housing. Such an embodiment is preferable particularly if the illuminants are formed by the planar LED printed circuit boards already mentioned. In this case, the reflector walls then preferably extend in an inclined fashion from the outer edge of the housing to the corresponding edge region of the LED printed circuit board. As a result, a mixing chamber is formed in the region in front of the LEDs within the luminaire housing, said mixing chamber resulting in better homogenization of the light in such a way that the LEDs are not discernible to an observer as individual point light sources. For this purpose, a transparent light emission element comprising a diffuser plate or a prism plate, for example, is arranged in particular preferably in the light emission region of the luminaire.

If a plate-shaped light emission body, that is to say for example a prism plate or a diffuser plate, is arranged in the region of the light exit opening of the housing, then it can furthermore preferably be provided that the cover element forms bearing surfaces which extend inward from the frame and can be used for supporting the planar light emission element. As a result, the construction of the luminaire is optimized further again, since the mounting of the transparent light emission element does not require any additional measures.

Ultimately, a luminaire is provided which, with regard to its possibilities for influencing the light emission, is equivalent to solutions known hitherto, but has a construction that is simpler and can thus be realized more cost-effectively.

The invention will be explained in greater detail below with reference to the accompanying drawing, in which.

Figure 1:
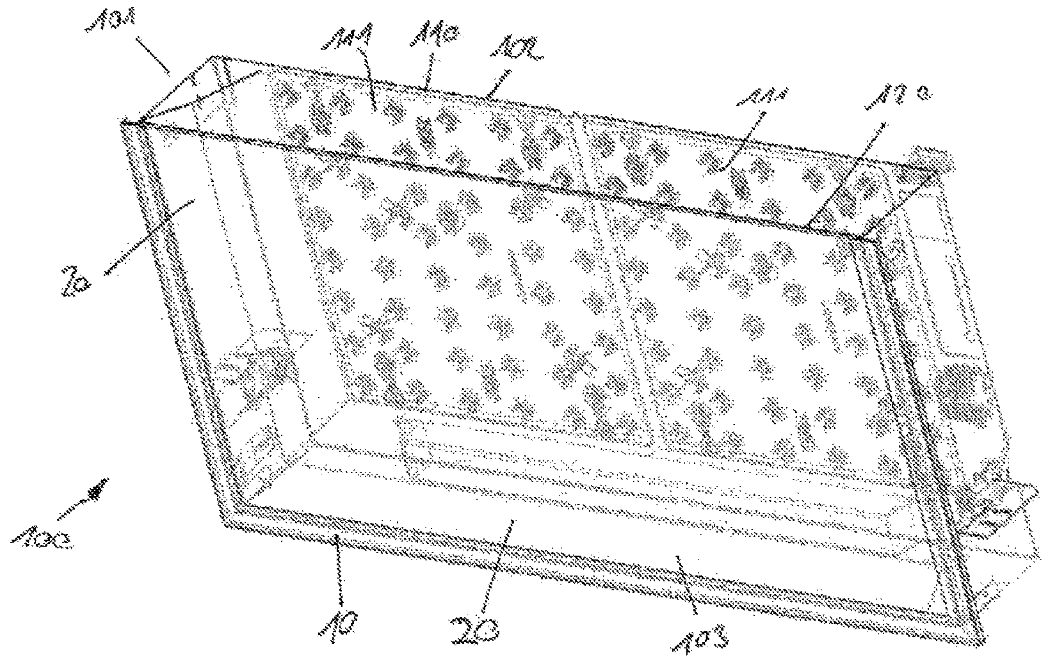
FIG. 1 shows a part of a flat luminaire in which a luminaire cover according to the invention in accordance with a first exemplary embodiment of the present invention is used.

As a preferred exemplary embodiment of the present invention, a so-called flat luminaire 100 is illustrated in FIG. 1, in which flat luminaire LEDs are used as light sources. The luminaire 100 has a box-shaped luminaire housing 101, on the base surface 102 of which the LED light sources are arranged in a planar fashion. The four side walls form a rectangular light emission opening 103 via which light is emitted. For this purpose, a planar light emission element is arranged in the region of the light emission opening 103, the construction of said light emission element being described in even greater detail later.

As already mentioned, LEDs are used as light sources, said LEDs in the present case being arranged in a matrix-like fashion on a plurality of LED printed circuit boards 110 positioned on the base surface 102 of the housing 101. In the exemplary embodiment illustrated, the LED printed circuit boards 110 are covered by a planar reflector element 111, such that the LEDs are protected against being inadvertently touched.

In order to obtain a homogeneous light emission, the transparent light emission element 120 is embodied in such a way that it breaks up the individual points of the LED printed circuit boards 110. That is to say that the light emission element 120 has light-scattering or light-influencing properties, in such a way that the LEDs are no longer discernible as individually luminous points. Furthermore, a contribution is made to the homogenization of the light emission by the fact that the reflector element 111 in turn reflects beams reflected back within the housing 101, such that multiple reflections take place. At the same time, provision is made of reflector walls 20 extending from the LED printed circuit boards 110 as far as the edge region of the light emission opening 103. In particular, the reflector wall 20 situated at the left-hand side of the housing is discernible in FIG. 1.

For optical reasons, a luminaire of the type illustrated generally also has a so-called frame-like cover, which is arranged at the open end region of the housing 101. It forms in this case a circumferential frame encompassing the light emission opening, such that the end sides of the housing 101 are not discernible to an observer.

Hitherto, the cover element 10 and the reflector walls 20 have been separate elements that have had to be fixed to the housing 101 in a corresponding manner during the assembly of the luminaire 100. In order to simplify the luminaire construction, it is now proposed that the optical elements, that is to say in particular the reflector walls 20, are part of the cover 10. This concept of the invention can be gleaned in more specific detail from the enlarged sectional illustration in FIG. 2, which shows a lateral end region of the luminaire housing 101.

It is evident in this case that the frame part 10 is embodied in such a way that it bears against the underside of the luminaire housing 101, but in this case additionally extends in the form of an oblique reflector 20 into the interior of the luminaire, in particular as far as toward the base surface 102. As already mentioned, this is an integrally embodied part whose regions which form the reflector surfaces are, if appropriate, also additionally coated with reflective materials.

Figure 2:
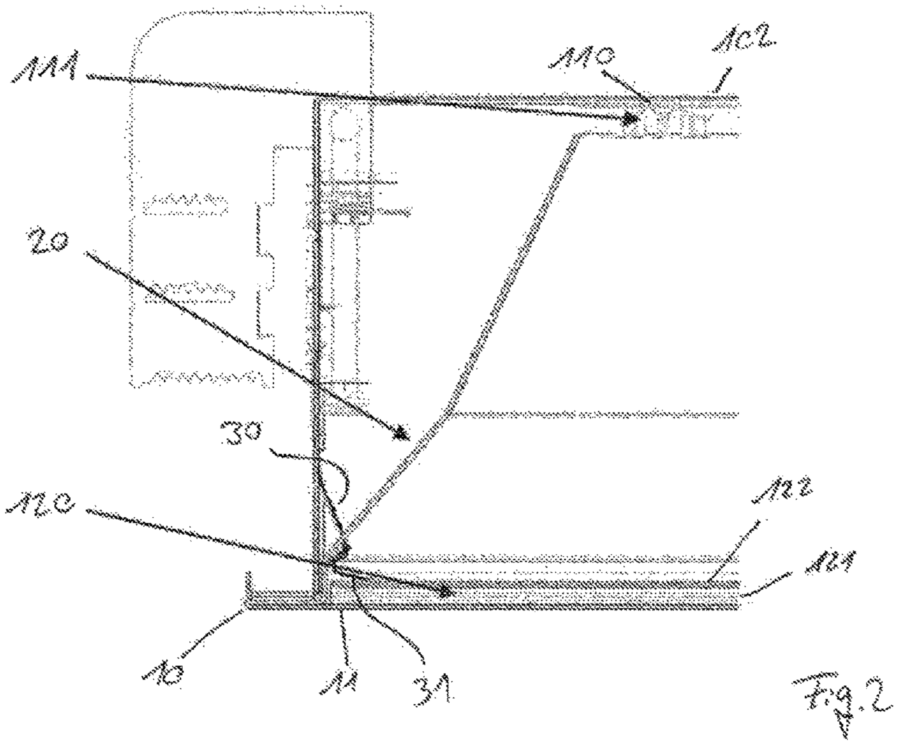
FIG. 2 shows an enlarged sectional illustration of a lateral region of the luminaire from FIG. 1 in which the configuration of the cover with the integrated reflector is discernible.

The fixing of the cover 10 according to the invention to the luminaire housing 101 is preferably carried out by virtue of the fact that a latching opening is provided in the lower partial section of the reflector wall region, into which latching opening engages a fixing spring 30 discernible in FIG. 2. Said fixing spring 30 is firstly fixed to the housing side wall for example with the aid of a screw and projects slightly into the inner region of the luminaire housing 101. If the cover 10 with the reflector walls 20 is then inserted into the open luminaire housing 101 from the underside, the springs 30 automatically engage into the corresponding openings in the reflector walls 20 and snap together therewith, in such a way that the structural unit comprising luminaire cover and reflector is latched with the housing 101 in a simple but efficient manner.

In the exemplary embodiment illustrated, this type of assembly is fostered by virtue of the fact that the reflector wall 20 is embodied in a slightly bent fashion, as can be gathered from the illustration in FIG. 2. As a result, a somewhat larger free space for arranging the components required for the fixing remains in the lower region. The reflector walls 20 themselves then extend obliquely upward as far as possible right into the edge region of the LED printed circuit boards 110.

Preferably, the frame section of the cover 10 is embodied in such a way that inwardly projecting bearing surfaces for the transparent planar light emission element 120 are formed. Strictly speaking, the light emission element is generally not a single planar element, but rather a layer arrangement consisting of a plastic plate 121, which can be provided with a prism system, if appropriate, and—arranged thereabove—a diffusing film 122 for homogenizing the light emission over the entire area. However, the construction of this planar light emission element 120 could also be embodied differently depending on desired light emission properties.

What is essential is that the frame section of the cover, as evident in FIG. 2, is embodied in such a way that inwardly projecting projections 11 are formed which extend over the four longitudinal sides of the light emission opening 103 and can accordingly be used for bearing the light emission element 120. In the case of an embodiment of the cover as a sheet-metal part, these bearing regions 11 can be formed in a simple manner in such a way that the corresponding end region, as illustrated, is bent inward again with an overhanging section.

For the assembly of the luminaire, the emission element 120 is then firstly placed into the cover or onto the bearing surfaces 11 and then the unit that results in this case is inserted into the luminaire housing 101 and latched by means of the springs 30. As illustrated, here the springs 30 can have in each case at their underside an inwardly projecting projection 31 that comes to bear on the top side of the emission element 120. As a result, this element is securely fixed in the desired position, such that simple transport of the luminaire 100 is also made possible, with no need to fear that the emission element 120 will fall out.

It is apparent that the specific configuration of the cover which unifies the functions of the frame and of the reflectors simplifies the construction of the luminaire overall and thus in particular also the assembly thereof.

Figure 3:
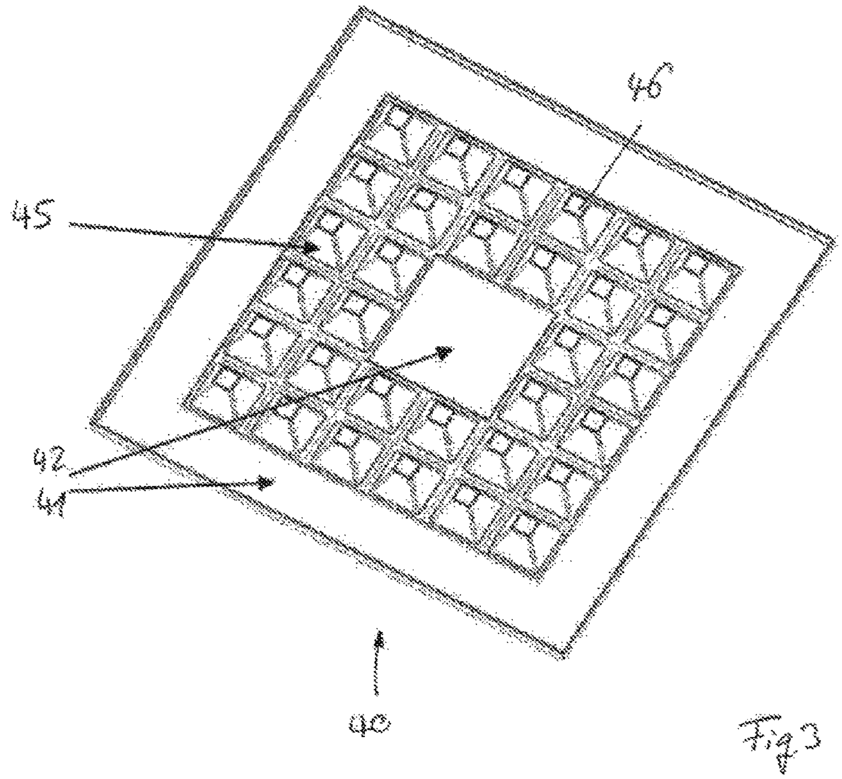
FIG. 3 shows a perspective view of a second embodiment of a luminaire cover according to the invention.
Figure 4:
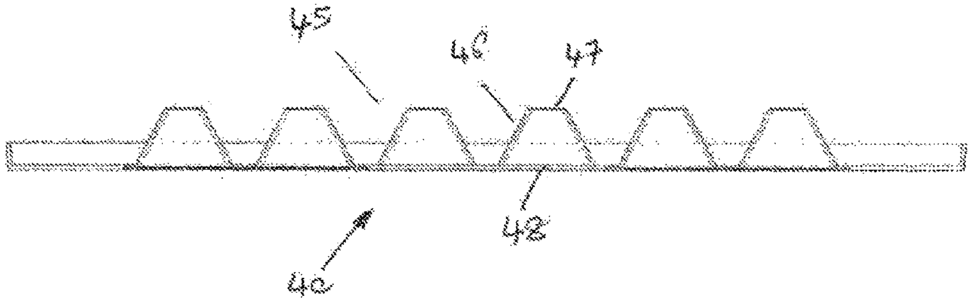
FIG. 4 shows a sectional illustration of the luminaire cover from FIG. 3.

An alternative variant for forming a luminaire cover according to the invention is shown in FIGS. 3 and 4. These figures illustrate exclusively the cover 40 itself, which could in turn be used in a luminaire such as is illustrated in FIG. 1. The cover 40 is therefore once again initially provided for forming a lower frame in the region of the light exit opening of the luminaire, but the cover 40 at the same time comprises an optical unit for influencing the light emission.

In the present exemplary embodiment, the optical unit consists of a so-called cell grid 45, that is to say of a plurality of pot-shaped reflector cells 46 arranged in a matrix, which will emit the light in each case directionally toward the underside. The reflector cells 46 are embodied in a truncated-pyramid-like fashion in accordance with the illustration in FIG. 4 and have a light entrance opening 47 at their upper, narrower end and a light emission opening 48 at their underside. Ideally, an individual cell 45 is respectively assigned to an individual light source.

In the illustrated second exemplary embodiment, too, the element 40 fulfils both functions, namely firstly providing a frame-shaped cover and secondly forming an optical unit for influencing the light emission. In this case, in accordance with the illustration in FIG. 3, a frame-like section 41 can be seen around the cell grid system 45, light being emitted diffusely via said frame-like section. At the same time, the central region can also be embodied as a planar region 42 without reflector cells, wherein light is then emitted via said region 42 likewise in a planar fashion, that is to say for example diffusely or in a directional manner through prism optical units. In this case, too, the construction of a corresponding luminaire is simplified, however, since hitherto cover and cell grid once again have had to be mounted separately in the luminaire housing.

Figure 5:
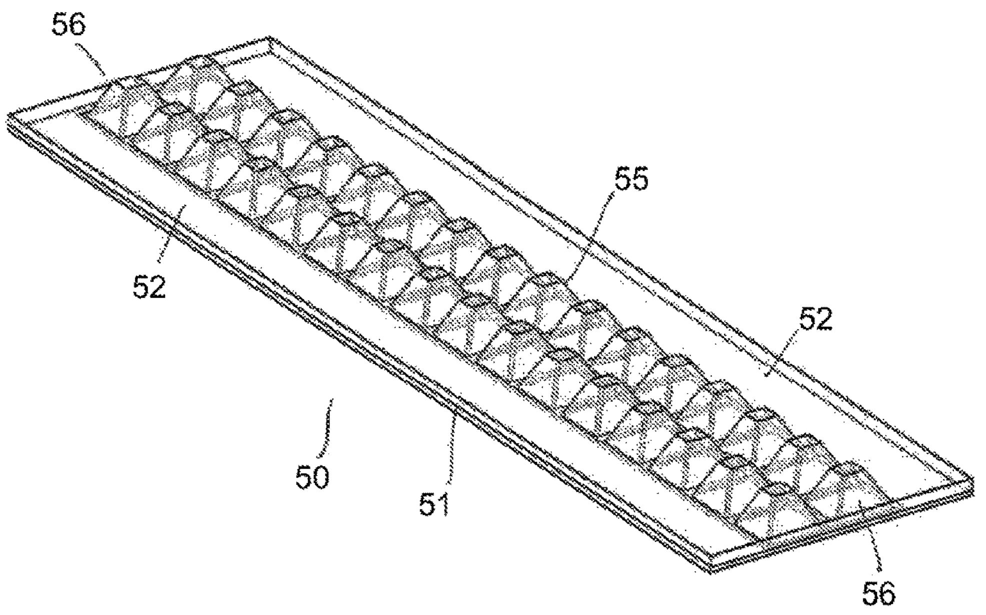
FIG. 5 shows a third exemplary embodiment of a luminaire cover according to the invention.

Finally, FIG. 5 shows a third exemplary embodiment of a cover 50 according to the invention, which is substantially similar to the exemplary embodiment in FIGS. 3 and 4. Here, too, the optical unit formed by the cover 50 consists of a cell grid system 55, which now consists, however, of two rows of reflector cells 56 running parallel to one another. The reflectors are embodied in a truncated-pyramid-like fashion analogously to the exemplary embodiment in FIGS. 3 and 4. It goes without saying, however, that the shape of the reflector cells could also be chosen differently, wherein the same also applies to the second exemplary embodiment. By way of example, rotationally shaped top reflectors or the like are also known from the prior art.

The circumferential frame 51 of the cover 50 once again serves for correspondingly covering the end region of the box-shaped luminaire housing. Longitudinal surfaces 52 emitting light diffusely are formed on both sides of the grid system 55 formed two rows of reflector cells 56. For this exemplary embodiment, too, it holds true that a plurality of tasks of a flat luminaire are realized by a single component.

The invention claimed is:

1. A flat luminaire comprising:

a box shaped luminaire housing, which has a light exit opening at one side; and a cover element arranged on the housing in a region of the light exit opening thereof to encompass a light emission region of a luminaire in a frame like fashion; and wherein the cover element is integrally connected to at least one optical element, which extends into an inner region of the luminaire housing and which is provided for influencing the light emitted by the luminaire;

wherein the optical element has reflector walls which extend in an inclined fashion from the frame to a light source situated in the luminaire housing; and wherein the luminaire further comprises a transparent planar light emission element, the frame like cover element having bearing surfaces projecting inward from the frame for bearing the planar light emission element.

2. The flat luminaire as claimed in claim 1, wherein the optical element is a grid arrangement.

3. The flat luminaire as claimed in claim 2, wherein the grid arrangement has a plurality of reflector cells which are arranged in a matrix-like fashion and which are embodied in a truncated-pyramid-like fashion.

4. The flat luminaire as claimed in claim 1, wherein the optical element is reflector walls which extend in an inclined fashion from the frame to a light source situated in the luminaire housing.

5. The flat luminaire as claimed in claim 4, wherein the reflector walls have means for fixing the cover element to the luminaire housing.

6. The flat luminaire as claimed in claim 5, wherein the fixing means are cutouts for connection to latching springs fixed to the luminaire housing.

* * * * *